United States Patent
Sala et al.

(10) Patent No.: US 7,260,119 B2
(45) Date of Patent: Aug. 21, 2007

(54) SYSTEM, METHOD, AND COMPUTER PROGRAM PRODUCT FOR ETHERNET-PASSIVE OPTICAL NETWORKS

(75) Inventors: Dolors Sala, Atlanta, GA (US); Ajay Chandra V. Gummalla, Atlanta, GA (US)

(73) Assignee: Broadcom Corporation, Irvine, CA (US)

(*) Notice: Subject to any disclaimer, the term of this patent is extended or adjusted under 35 U.S.C. 154(b) by 1120 days.

(21) Appl. No.: 10/224,474

(22) Filed: Aug. 21, 2002

(65) Prior Publication Data

US 2003/0048801 A1   Mar. 13, 2003

Related U.S. Application Data

(60) Provisional application No. 60/313,499, filed on Aug. 21, 2002.

(51) Int. Cl.
*H04J 3/06* (2006.01)
*H04J 3/22* (2006.01)
*H04B 7/212* (2006.01)

(52) U.S. Cl. .................. 370/510; 370/469; 370/350; 370/324

(58) Field of Classification Search .............. None
See application file for complete search history.

(56) References Cited

U.S. PATENT DOCUMENTS

| | | | | |
|---|---|---|---|---|
| 4,380,063 A | * | 4/1983 | Janson et al. ............... | 370/235 |
| 4,887,266 A | * | 12/1989 | Neve et al. .................. | 370/349 |
| 4,922,414 A | * | 5/1990 | Holloway et al. .......... | 711/207 |
| 5,469,283 A | | 11/1995 | Vinel et al. | |
| 5,604,742 A | * | 2/1997 | Colmant et al. ............ | 370/396 |
| 5,659,615 A | * | 8/1997 | Dillon ........................ | 713/162 |
| 5,864,415 A | | 1/1999 | Williams et al. | |
| 6,430,408 B1 | * | 8/2002 | Dorenbosch ............. | 455/414.1 |
| 6,456,590 B1 | * | 9/2002 | Ren et al. .................... | 370/229 |
| 6,473,694 B1 | * | 10/2002 | Akopian et al. ............ | 701/213 |
| 6,724,725 B1 | * | 4/2004 | Dreyer et al. ............... | 370/231 |
| 6,836,851 B2 | * | 12/2004 | Dive .......................... | 713/400 |
| 2003/0193896 A1 | * | 10/2003 | De Groote et al. ...... | 370/241.1 |

OTHER PUBLICATIONS

International Search Report for International Application No. PCT/US02/26512, International Filing Date: Aug. 21, 2002.

* cited by examiner

*Primary Examiner*—Chi Pham
*Assistant Examiner*—Ronald Abelson
(74) *Attorney, Agent, or Firm*—Sterne, Kessler, Goldstein & Fox P.L.L.C.

(57) ABSTRACT

A system, method, and computer program product for synchronizing time between a centralized controller device and at least one subscriber device on an Ethernet Passive Optical Network (EPON). The MAC control layer of an EPON device is expanded, and additional messaging control is added via the transmission of Ethernet frames. The expansion prevents reliance on a physical layer signal. The time synchronization also allows a time stamp to be incorporated into a message. Thus, bandwidth is not wasted by simply transmitting a time stamp by itself. In an embodiment, the centralized controller device measures the time difference between the time at which a particular ranging request is transmitted and the time at which the particular ranging request is received. The time difference represents the time adjustment value for the particular subscriber device and allows the device to synchronize its time with that of the centralized controller device.

33 Claims, 6 Drawing Sheets

SYSTEM, METHOD, AND COMPUTER PROGRAM PRODUCT FOR ETHERNET-PASSIVE OPTICAL NETWORKS

CROSS-REFERENCE TO RELATED APPLICATIONS

This patent application claims priority to U.S. Provisional Application No. 60/313,499 filed Aug. 21, 2002, and incorporated herein by reference in its entirety.

BACKGROUND OF THE INVENTION

1. Field of the Invention

The invention described herein relates to communications systems, and more particularly to optical networks.

2. Related Art

Ethernet passive optical networks (EPON) are an emerging access network technology that provides a low-cost method of deploying optical access lines between a carrier's central office and a customer site. EPONs seek to bring to life the dream of a full-services access network (FSAN) that delivers converged data, video, and voice over a single optical access system. The carrier's central office typically contains a centralized controller device which is in optical communication with at least one subscriber device at the customer site. To communicate effectively with a subscriber device, the centralized controller device must be synchronized with the subscriber device.

For example, a section of the downstream channel can be framed for timing synchronization. A physical layer signal can be periodically transmitted on the framed portion of the downstream channel to broadcast a global time. This process creates problems, however, in that, the EPON has to rely on an exact transmission time. Further, such a process can be inefficient, as the signal has to be constantly transmitted, thereby wasting valuable bandwidth for transmitting time signals. Hence, what is needed is a method for expanding the MAC control layer in an EPON device to add additional control messaging to ensure efficient time synchronization and appropriate shared access of the media between a centralized controller device and subscriber devices in an EPON.

SUMMARY OF THE INVENTION

The invention described herein addresses access operation between a centralized controller device and at least one subscriber device on an Ethernet Passive Optical Network (EPON). The MAC control layer of an EPON device is expanded, and additional messaging control is added via the transmission of Ethernet frames. The expansion is independent of the physical layer definition. The time synchronization of the present invention also allows a time stamp to be incorporated into a message. Thus, bandwidth is not wasted by simply transmitting a time stamp by itself. The method begins with the centralized controller device transmitting a time synchronization message to the subscriber devices to specify a global time reference. The centralized controller device then allocates a ranging interval during which the time at each subscriber device is synchronized with the time at the centralized controller device.

During the ranging interval, a subscriber device transmits a ranging request to the centralized controller device to request time adjustment. The centralized controller device measures the time difference between the time at which a particular subscriber device's ranging request is transmitted and the time at which the ranging request is received by the centralized controller device. The time difference represents the time adjustment value for the particular subscriber device. A token transmitted by the centralized controller device contains the time adjustment value to be used by the particular subscriber device to synchronize its clock with that of the centralized controller device. The centralized controller device then transmits a token to at least one of the subscriber devices to allocate bandwidth to the device. At this point, the subscriber device is operational in the network, will use the bandwidth assigned, and will request more if needed.

DETAILED DESCRIPTION OF THE INVENTION

A preferred embodiment of the present invention is now described with reference to the figures, where like reference numbers indicate identical or functionally similar elements. Also in the figures, the left-most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

While the present invention is described herein in the context of EPONs, it should be understood that the systems and methods discussed below are also applicable in other contexts as well. Generally, these systems and methods are applicable to any fiber access system such as the present invention. While this invention is described as included in the MAC control layer, it should be understood that the invention is also applicable to other layers. For example, the invention can also be implemented in a control layer having an extension of an ethernet protocol to control transmission between subscriber devices in a Passive Optical Network (PON)-like media based on a definition of ethernet frames for control.

The invention described herein is a system architecture for an Ethernet-Passive Optical Network (EPON). The architecture provides extended functionality of the system control features at the media access control (MAC) control layers of devices coupled to the EPON (e.g., optical line terminator (OLT) and optical network unit (ONU)). The extended functionality of the system control features occurs through the transmission of ethernet frames. Thus, the architectural approach of the present invention provides flexible allocation of bandwidth. This allows efficient sharing of bandwidth by subscriber devices, referred to herein as ONUs. Further, having the extended functionality of the system control features at the MAC control layer avoids modification of the physical layer definition to a large extent.

Figure 1:
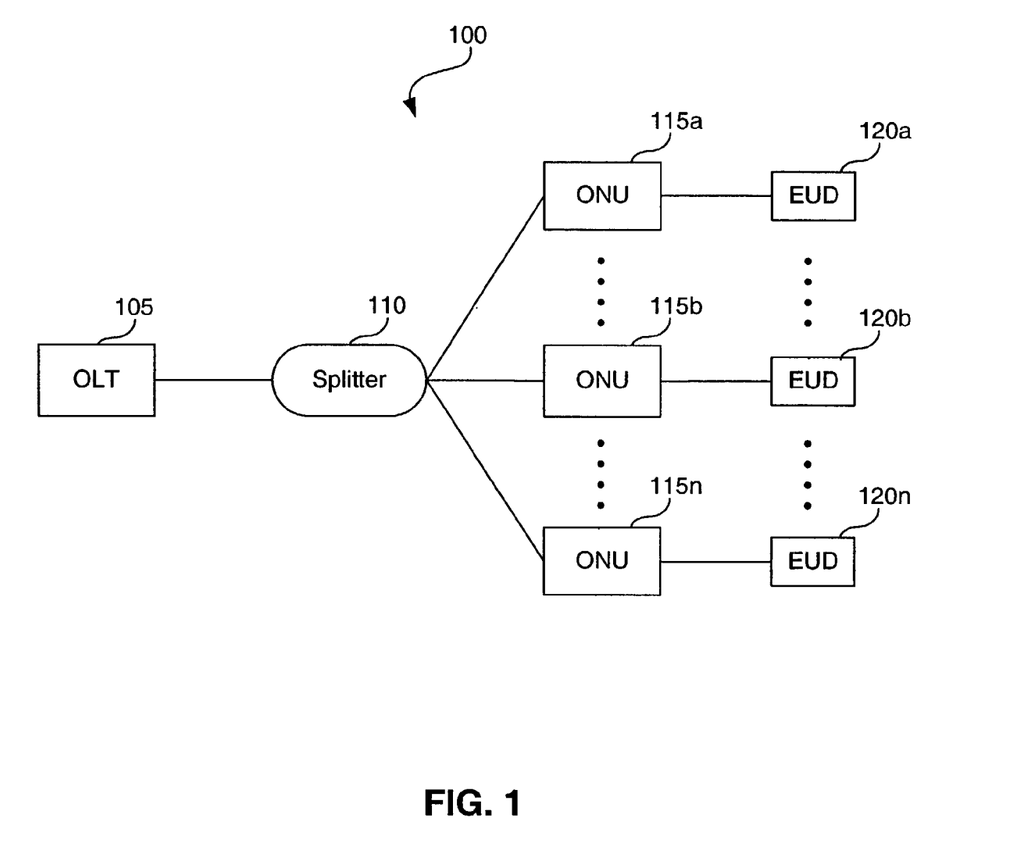
FIG. 1 is a block diagram illustrating an ethernet passive optical network system (EPON) according to embodiments of the present invention.

FIG. 1 illustrates an EPON 100 in accordance with embodiments of the present invention. An EPON is a PON in which the transmission protocol is in Ethernet. EPON 100 is well suited to delivering video services in either analog CATV format, using a third wavelength, or IP video. EPON 100 comprises Optical Line Terminator (OLT) 105, Splitter 110, Optical Network Units (ONUs) 115a-115n, and End User Devices (EUDs) 120a-120n.

OLT 105 broadcasts data downstream to ONUs 115a-115n in variable-length packets of up to 1,518 bytes, according to the IEEE 802.3 protocol. Each packet carries a header that uniquely identifies it as data intended for a particular ONU (e.g., ONU 115b). In addition, some packets may be intended for all of ONUs 115a-115n or a particular group of ONUs (multicast packets) such as ONUs 115b and 115n.

Splitter 110 divides data on EPON 100 into n separate signals, each carrying ONU-specific packets. When the data reaches a particular ONU, the ONU accepts the packets that are intended for it and discards the packets that are intended for other ONUs. For example, in FIG. 1, ONU 115a can receive packets destined for ONUs 115b and 115n as well as packets destined for itself. ONU 115a, however, only accepts the particular packet(s) that was actually intended for it. ONU 115a then delivers the packet(s) to its associated device (i.e. End User Device (EUD) 120a).

Each ONU 115a-115n provides an interface between the customer's data, video, and telephony networks (e.g. EUD 120a-120n) and EPON 100. The primary function of each ONU 115a-115n is to receive traffic in an optical format and convert it to the customer's desired format (e.g., Ethernet, Internet Protocol (IP), multicast, Plain Old Telephone System (POTS), etc.). Each ONU 115a-115n may provide Layer-2 or Layer-3 switching functionality, which allows internal routing of enterprise traffic at ONUs 115a-115n.

Because each of ONU 115a-115n can be located at a customer location and the costs are not shared over multiple subscribers, the design and cost of each ONU is a key factor in the acceptance and deployment of EPON systems.

Figure 2:
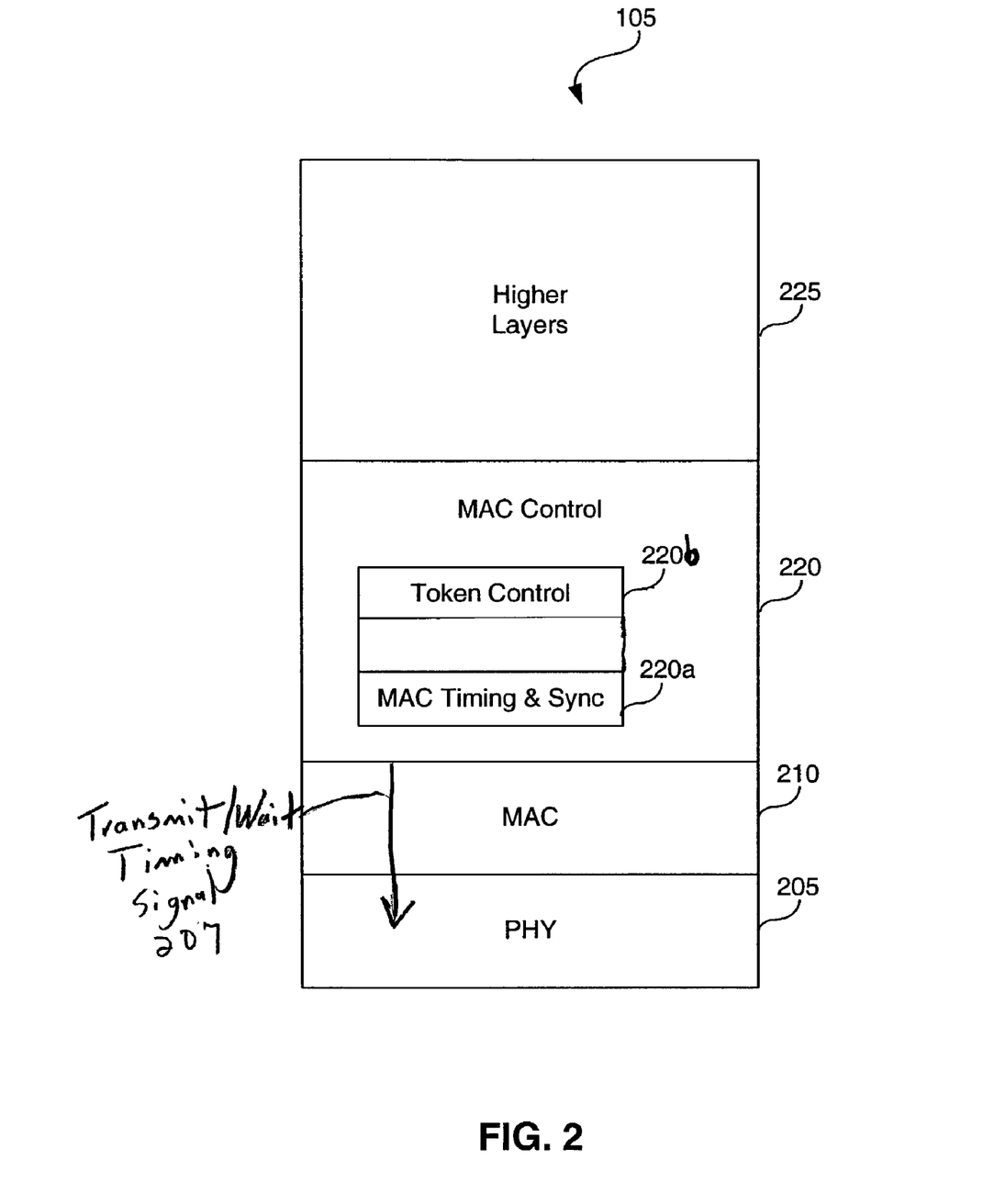
FIG. 2 is a high-level block diagram illustrating the architecture of an EPON system device according to embodiments of the present invention.

FIG. 2 illustrates the protocol architecture of an EPON system device (e.g., OLT 105) according to embodiments of the present invention. For example, an optical line terminator (OLT) and an optical network unit (ONU) can operate under the protocol architecture depicted in FIG. 2. The protocol architecture comprises physical layer 205, MAC layer 210, MAC control layer 220 and higher layers 225. Physical layer 205 is the protocol layer that defines the physical characteristics of the network such as connections, voltage levels and timing.

It should be noted that in addition to the extension at MAC control layer 220 (described below), the present invention also utilizes a signal from MAC control layer 220 to physical layer 205 (for burst operation in the ONU only). In embodiments, the signal is a "transmit/wait" timing signal (e.g. 207) and represents an active and passive (i.e., on/off) state of the laser, as would be apparent to one skilled in the art after being presented with the description herein. The ONU should not transmit in the passive state, as it does not have a token (It should be noted that the term token is used herein to encompass a bandwidth grant opportunity). When the ONU has receipt of a token, however, MAC control layer 220 transmits a signal to turn on the "transmit/wait" timing signal in order to activate the laser so the ONU can tranmit.

MAC control layer 220 controls the MAC and includes extended functionality such as that provided by MAC timing and synchronization layer 220a and token control layer 220b.

MAC timing and synchronization layer 220a is responsible for ensuring that all devices on the EPON are synchronized to a common time reference (e.g., an ONU knows when to transmit when it receives a grant for time TO). For example, all of the subscriber devices (e.g., ONUs) must be synchronized to the same time reference as that of the centralized controller device (e.g., OLT). Thus, the centralized controller device maintains a clock. The centralized controller device periodically broadcasts the clock timing in a synchronization message addressed to each of the subscriber devices. The synchronization message allows each subscriber device to synchronize its clock with that of the centralized controller device.

The centralized controller device utilizes a process known as ranging to compute time compensation, as will be described in FIG. 3.

Token control layer 220b allows for the request and allocation of tokens. A token from the centralized controller specifies an interval of time (e.g., a virtual time unit (VTU)) during which a subscriber device may transmit data packets. The request for the bandwidth (from the subscriber device to the central controller) can include priority information such as the priority level of the requested token, a key sequence (e.g., sequence number of the encryption key to use), and the amount of the requested bandwidth in VTUs. It should be noted that in an embodiment wherein a subscriber device specifies the sequence number in its request, the centralized controller device already knows which encryption key to use in communicating with the subscriber device as it was specified in the subscriber device's request. Thus, the centralized controller device need not provide the sequence number to the subscriber device when a frame is sent on the downstream. Upon receiving a request for bandwidth, the centralized controller device provides the subscriber device with a token. The token specifies a time offset value (e.g., time offset from a VTU allocation time reference), a type of region (e.g., ranging, data, periodic ranging, etc.), a priority (e.g., level of priority of the requested token), a key sequence (e.g., sequence number of the encryption key to use), and a size value (e.g., size of the region specified by the token in VTUs). It should be noted that in an embodiment wherein the centralized controller device specifies the sequence number of the encryption key to use, a subscriber device already knows what encryption key to use on the upstream transmission. Thus, the frame in the upstream direction need not indicate which sequence number should be used. The actual sequence of token control activity will be further described in FIG. 3.

Higher layer 225 is responsible for service setup and configuration. Higher layer 225 can contain a service controller for data admission and shaping and policing of activities. Further, higher layer 225 can receive statistics from MAC control layer 220 to aid in the policing of activities.

Figure 3:
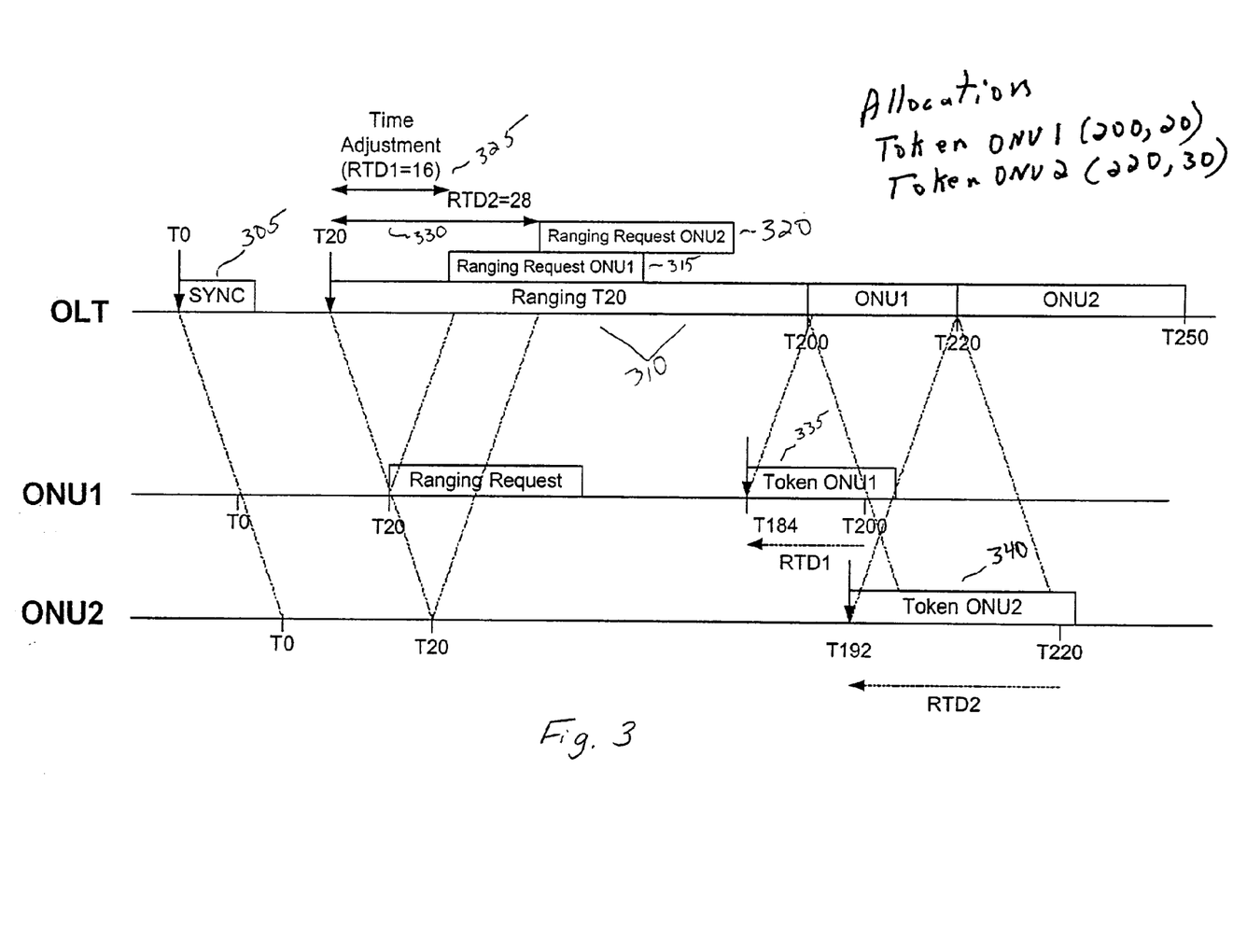
FIG. 3 is a timing diagram depicting timing synchronization between an OLT and two ONUs on an EPON.

FIG. 3 depicts timing correction between an OLT (e.g., a centralized controller device) and ONUs (e.g., subscriber devices). The process of correcting timing between an OLT and an ONU is known as ranging. Ranging adjusts each ONU's timing offset such that it is aligned with the OLT's timing. Ranging may be contention-based or non contention-based. In non-contention-based ranging, a token is transmitted to a specific subscriber device such that only that subscriber device may participate in the ranging process (i.e., manual registration occurs). In contention based ranging, a token is transmitted to all subscriber devices such that they all can contend for transmission. As explained above, this process is applied in the present invention in an EPON environment but may be applied in other environments as well.

Referring to FIG. 3, at time T0, the OLT transmits a synchronization message to reflect the global time. This is the time all devices on the EPON will recognize as time T0. Time 0, however, occurs at a different point for each device on the EPON. In other words, time 0 at ONU1 occurs at a different point than time T0 at ONU2. Similarly, time T0 at the OLT occurs at a different point than time T0 at ONU1 and ONU2. For example, ONU1 may recognize time T0 when the OLT is already at time T10. Thus, ranging compensates for this time difference.

Transmission of synchronization message 305 from the OLT indicates that the time synchronization method is to be executed. Transmission of synchronization message 305 from the OLT to an ONU can occur as frequently or infrequently as the designer would like. For example, synchronization message 305 can be sent at OLT time 0, OLT time 100, OLT time 200, etc. In an embodiment of the invention, every message from the OLT to an ONU contains a time stamp and can therefore be viewed as a synchronization message.

After the OLT transmits synchronization message 305 to ONU1 and ONU2, it then transmits a ranging interval message (not shown) to establish ranging interval 310. Transmission of the ranging interval message indicates to all devices that ranging will occur for a specified period of time. During ranging interval 310, each ONU may transmit a ranging request to the OLT to notify the OLT that it would like to request bandwidth. For example, in FIG. 3, after the OLT transmits the ranging interval message, and thereby establishes ranging interval 310, ONU1 can transmit ranging request 315 to the OLT to obtain its time adjustment value to request bandwidth. Similarly, after the OLT transmits the ranging interval message, ONU2 can transmit ranging request 320 to the OLT to obtain its time adjustment value to request bandwidth.

After the OLT receives a ranging request from an ONU (e.g., ranging request 315 from ONU1), the OLT calculates the difference in the time at which the particular ONU transmitted the ranging request and the time at which the OLT receives the ranging request. The time difference represents the time adjustment value for the particular ONU. For example, in FIG. 3, the difference between the time at which ONU1 transmitted ranging request 315 and the time at which the OLT receives ranging request 315 is represented by time adjustment value 325 (i.e., a round trip delay (RTD) of 16). Similarly, the difference between the time at which ONU2 transmitted ranging request 320 and the time at which the OLT received ranging request 320 is represented by time adjustment value 330 (i.e., a round trip delay (RTD) of 28). Both ONU1 and ONU2 have now been synchronized with the OLT.

The OLT then issues token 335 to ONU1 to grant ONU1 bandwidth in which to transmit data. For example, token 335 specifies that ONU1 has been assigned 20 units of bandwidth (i.e., from OLT time 200 to OLT time 220). It should be noted that the OLT can calculate the time adjustment period for ONU1, for example, and send the time difference to ONU1. Thus, ONU1 is told that it must begin transmitting at its local time 184 in order to begin transmitting at OLT time 200, as its clock is 16 units behind that of the OLT.

Alternatively, in embodiments of the present invention, the OLT can send the time adjustment to the ONU and specify the grant time according to the OLT time. Each ONU can then translate the grant time to local time by subtracting the ONU time adjustment period from the grant time.

Likewise, the OLT issues token 340 to ONU2 to grant ONU2 bandwidth in which to transmit data. For example, token 340 specifies that ONU2 has been assigned 30 units of bandwidth (i.e., from OLT time 220 to OLT time 250). The OLT has already calculated the time adjustment period for ONU2. Thus, ONU2 is told that it must begin transmitting at its local time 192 in order to begin transmitting at OLT time 220, as its clock is 28 units behind that of the OLT.

Figure 4:
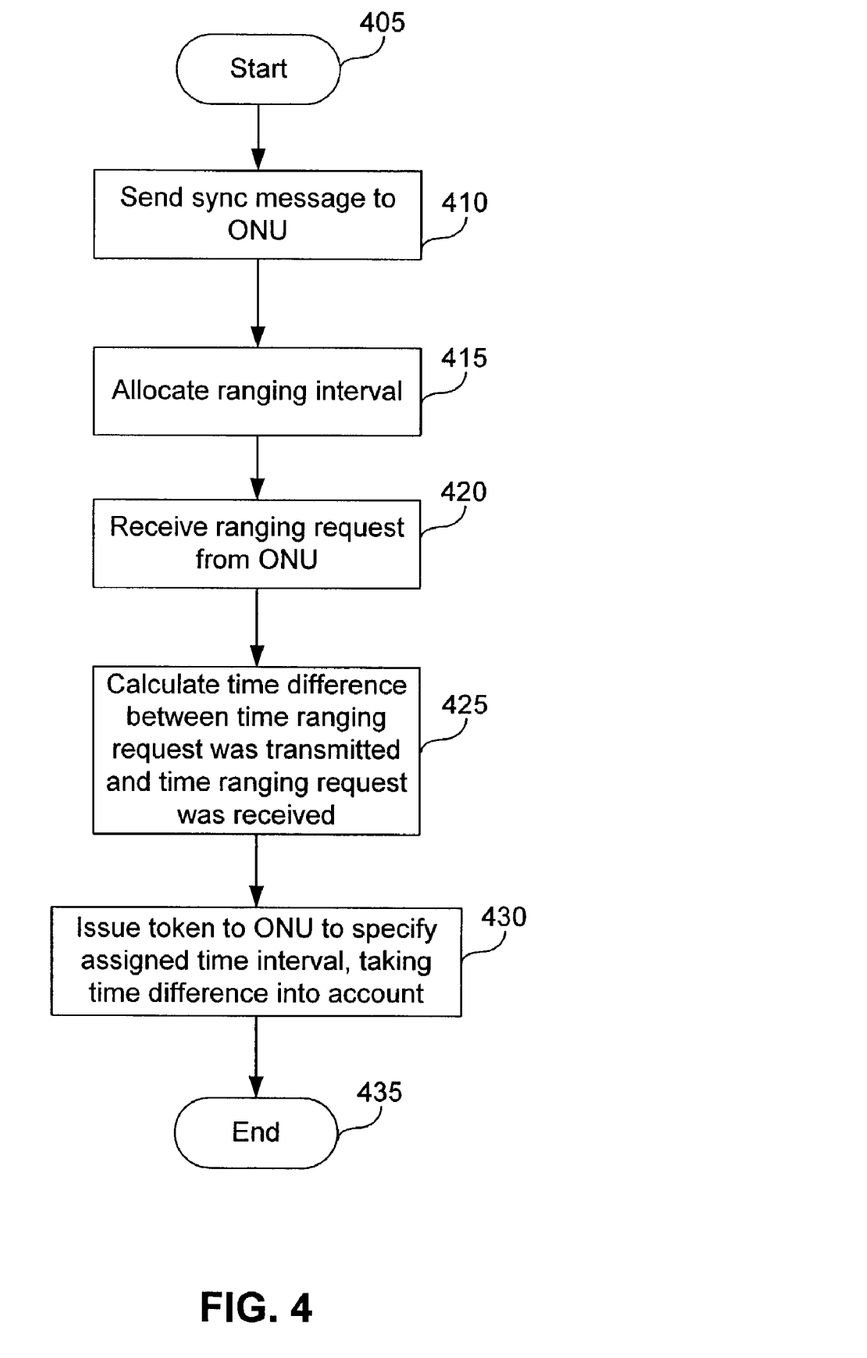
FIG. 4 is a flowchart depicting the sequence of steps involved in the communication process from the perspective of an OLT.

FIG. 4 depicts the sequence of steps involved in the communication process from the perspective of an OLT. Control begins with step 405 and proceeds immediately to step 410. In step 410, the OLT transmits a synchronization message to the ONUs. The synchronization message indicates that the time synchronization method is to be executed.

In step 415, the OLT allocates a ranging interval message to establish a ranging interval. During the ranging interval, the ranging process will be performed.

In step 420, the OLT receives a ranging request from a particular ONU. The ranging request indicates to the OLT that the particular ONU wishes to have its time synchronized.

In step 425, the OLT calculates the time difference between a time at which the particular ONU transmitted its ranging request and a time at which the OLT received the ranging request. This time difference represents the time adjustment value for the particular ONU. In step 430, the OLT issues a token to a particular ONU to specify an assigned time interval (i.e., a period of time during which the particular ONU may transmit data) for the ONU. For example, if the time adjustment value was determined to be 24 units, the token specifies that the particular ONU should begin data transmission 24 units before the assigned OLT time period, given that the ONU clock is 24 units behind that of the OLT clock. Again, it should be noted that the system can operate with grant time specifying the OLT time and having each ONU translate the grant time to local time by subtracting the ONU time adjustment period from the grant time.

Finally, control ends with step 435.

Figure 5:
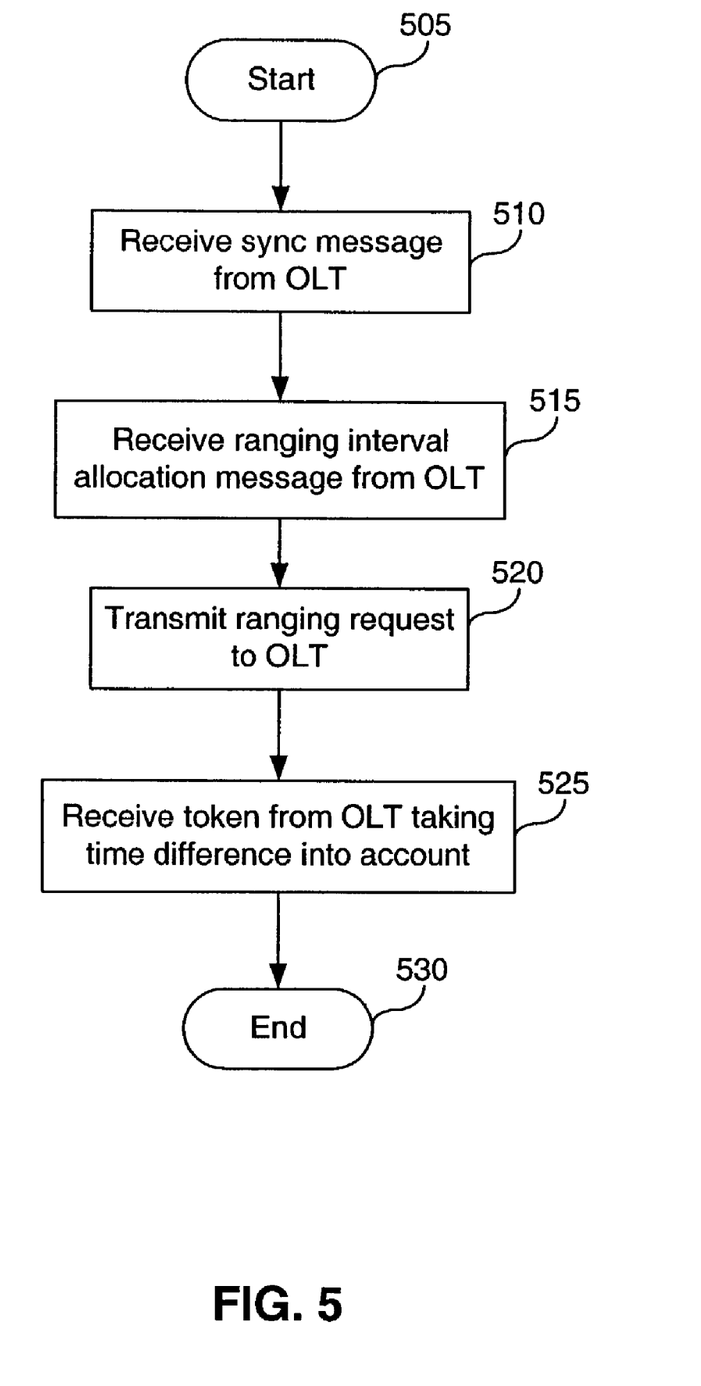
FIG. 5 is a flowchart depicting the sequence of steps involved in the communication from the perspective of an ONU.

FIG. 5 is a flowchart depicting the sequence of steps involved in the communication process from the perspective of an ONU (e.g., establishing management service). Control begins with step 505 and proceeds immediately to step 510. In step 510, a synchronization message is received from the OLT to obtain a common time reference.

In step 515, the ONU receives a ranging interval allocation message specifying a period of time during which ranging will occur.

In step 520, the ONU transmits a ranging request to the OLT to have its time synchronized (i.e., to have its time adjusted) with that of the OLT. In step 525, the ONU monitors broadcast tokens and receives a token from the OLT taking into consideration the time adjustment value. The ONU can then engage in a registration process with the OLT (i.e., the ONU can establish primary service with the OLT). Finally, control ends with step 530.

Figure 6:
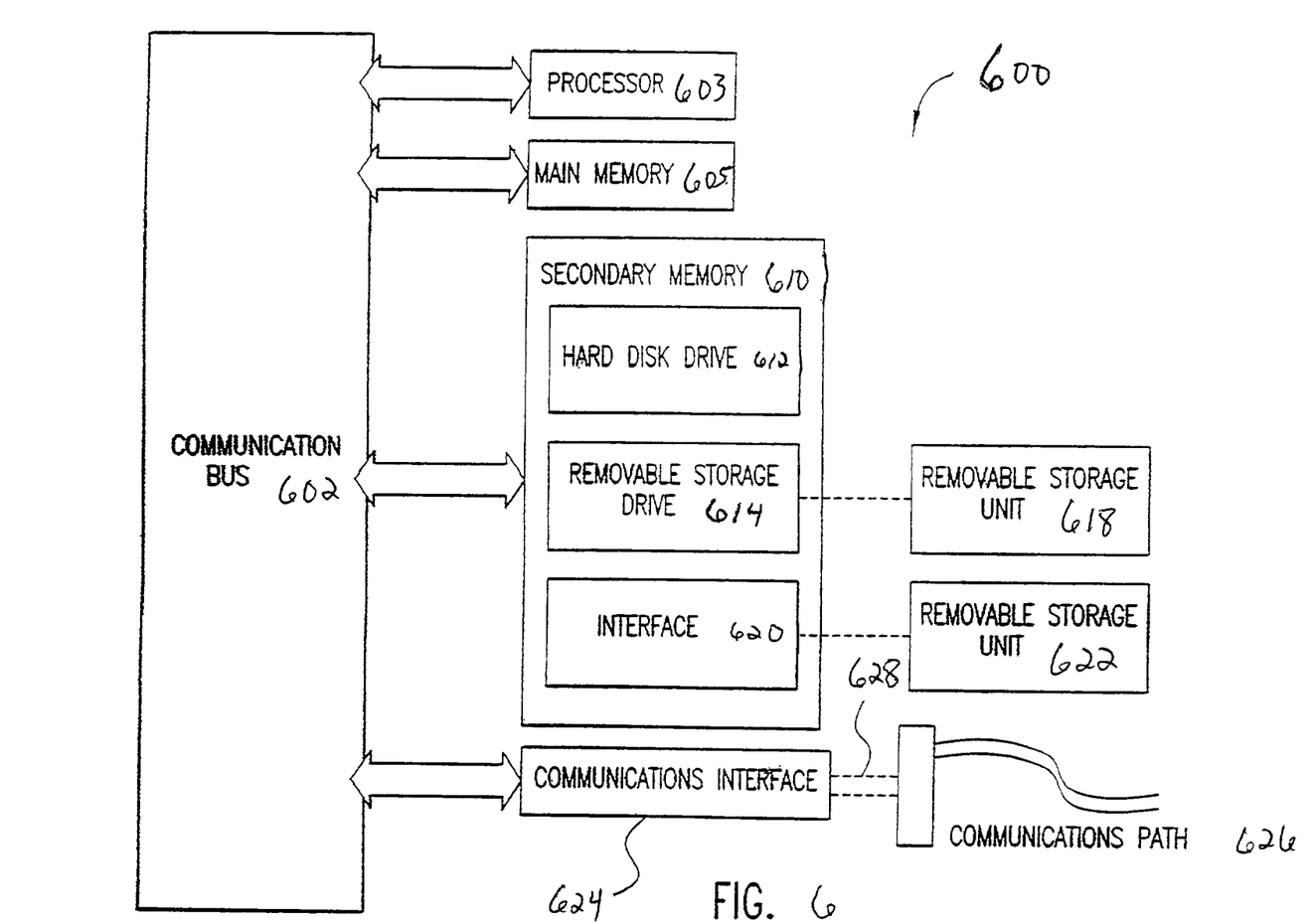
FIG. 6 is a diagram illustrating an exemplary computer system on which a method in accordance with embodiments of the present invention can be performed.

FIG. 6 is a diagram illustrating an exemplary computer system on which a method in accordance with embodiments of the present invention can be performed. The above-described techniques or methods may be executed as software routines, in part, by the Media Access Control (MAC) portion of a subscriber device and the MAC portion of a centralized controller device. For example, with reference to the example implementation of ONU 115a described in FIG. 1, ONU 115a includes a MAC (not shown) for performing necessary method steps by executing software functions with the assistance of a Central Processing Unit (CPU). These software functions are stored in a memory, such as but not limited to a Random Access Memory (RAM) or a Read Only Memory (ROM). Furthermore, with reference to the example implementation of OLT 105, its MAC performs necessary method steps by executing software functions with the assistance of a CPU. These software functions are also stored in a memory, which may comprise either a RAM or a ROM.

However, methods of the present invention need not be limited to these embodiments. For example, the methods of the present invention may be embodied in software routines which are executed on various computer systems, such as a computer system 600 as shown in FIG. 6. However, after reading this description, it will be apparent to a person skilled in the relevant art how to implement the invention using other computer systems and/or computer architectures. The computer system 600 includes one or more processors, such as processor 603. The processor 603 is connected to a communication bus 602.

Computer system 600 also includes a main memory 605, preferably random access memory (RAM), and may also include a secondary memory 610. The secondary memory 610 may include, for example, a hard disk drive 612 and/or a removable storage drive 614, representing a floppy disk drive, a magnetic tape drive, an optical disk drive, etc. The removable storage drive 614 reads from and/or writes to a removable storage unit 618 in a well-known manner. Removable storage unit 618, represents a floppy disk, magnetic tape, optical disk, etc., which is read by and written to by removable storage drive 614. As will be appreciated, the removable storage unit 618 includes a computer usable storage medium having stored therein computer software and/or data.

In alternative embodiments, secondary memory 610 may include other similar means for allowing computer programs or other instructions to be loaded into computer system 600. Such means may include, for example, a removable storage unit 622 and an interface 620. Examples of such may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a PCM-CIA slot and card, a wireless LAN (local area network) interface, etc. Software and data transferred via communications interface 624 are in the form of signals 628 which may be electronic, electromagnetic, optical, or other signals capable of being received by communications interface 624. These signals 628 are provided to communications interface 624 via a communications path (i.e., channel) 626. This channel 626 carries signals 628 and may be implemented using wire or cable, fiber optics, a phone line, a cellular phone link, a wireless link, or other communications channels.

In this document, the term "computer program product" refers to removable storage units 618, 622, and signals 628. These computer program products are means for providing software to computer system 600. The invention is directed to such computer program products.

Computer programs (also called computer control logic) are stored in main memory 605, and/or secondary memory 610 and/or in computer program products. Computer programs may also be received via communications interface 624. Such computer programs, when executed, enable the computer system 600 to perform the features of the present invention as discussed herein. In particular, the computer programs, when executed, enable the processor 603 to perform the features of the present invention. Accordingly, such computer programs represent controllers of the computer system 600.

In an embodiment where the invention is implemented using software, the software may be stored in a computer program product and loaded into computer system 600 using removable storage drive 614, hard drive 612 or communications interface 624. The control logic (software), when executed by the processor 603, causes the processor 603 to perform the functions of the invention as described herein.

In another embodiment, the invention is implemented primarily in hardware using, for example, hardware components such as application specific integrated circuits (ASICs). Implementation of hardware state machine(s) so as to perform the functions described herein will be apparent to persons skilled in the relevant art(s).

In yet another embodiment, the invention is implemented using a combination of both hardware and software.

CONCLUSION

While various embodiments of the present invention have been described above, it should be understood that they have been presented by way of example, and not limitation. It will be apparent to persons skilled in the relevant art that various changes in detail can be made therein without departing from the spirit and scope of the invention. Thus the present invention should not be limited by any of the above-described exemplary embodiments.

What is claimed is:

1. An ethernet-passive optical networking system, comprising:
    a centralized controller device implementing a Media Access Control (MAC) control layer; and
    at least one subscriber device implementing said MAC control layer in optical communication with said centralized controller device,
    wherein each said implementation of the MAC control layer comprises:
        a transmit/wait timing signal from said MAC control layer to a physical layer, wherein said signal represent an active or passive state of a laser; and
        extended functionality that is implemented through transmission of ethernet frames.

2. The ethernet-passive optical networking system of claim 1, wherein said extended functionality of said MAC control layer in said centralized controller device includes token allocation.

3. The ethernet-pasive optical networking system of claim 2, wherein said token specifies a sequence number of an encryption key to be used by said at least one subscriber device.

4. The ethernet-passive optical networking system of claim 1, wherein said extended functionality of said MAC control layer in said at least one subscriber device includes token request and receipt.

5. The ethernet-passive optical networking system of claim 1, wherein said extended functionality of said MAC control layer includes MAC timing and synchronization between said centralized control device and said at least one subscriber device.

6. The ethernet-passive optical networking system of claim 5, wherein said MAC timing and synchronization is initiated by transmission of a synchronization message from said centralized controller device to said at least one subscriber device.

7. The ethernet-passive optical networking system of claim 5, wherein said MAC timing and synchronization includes allocation of a ranging interval specified by said centralized controller device.

8. The ethernet-passive optical networking system of claim 5, wherein said MAC timing and synchronization includes transmission of a ranging request from said at least one subscriber device to said centralized controller device.

9. The ethernet-passive optical networking system of claim 5, wherein said centralized controller device determines a time adjustment period corresponding to a difference in time between a clock at said centralized controller device and a clock at said subscriber device.

10. The ethernet-passive optical networking system of claim 9, wherein said time adjustment period is derived from a time difference between a message timestamp and a message arrival time at an optical line terminator.

11. The ethernet-passive optical networking system of claim 9, wherein an optical line terminator specifies a grant assignment adjusted by a corresponding optical network unit adjustment period to represent said grant assignment in optical network unit local time.

12. The ethernet-passive optical networking system of claim 9, wherein said centralized controller device transmits a time adjustment message to said subscriber device.

13. The ethernet-passive optical networking system of claim 12, wherein an optical line terminator specifies the grant assignments according to the time at said optical line terminator and an optical network unit adjusts its local time based on the received adjustment period.

14. The ethernet-passive optical networking system of claim 5, wherein every message from said centralized controller device to said subscriber device contains synchronization information.

15. The ethernet-passive optical networking system of claim 1, wherein said subscriber device transmits in said active state only.

16. A method of communication between a centralized controller device and at least one subscriber device in an ethernet-passive optical networking system, wherein each device implements a MAC control layer having extended functionality, comprising the following steps performed via transmission of ethernet frames in the MAC control layer:
   (a) transmitting a ranging grant from the centralized controller device to the at least one subscriber device;
   (b) receiving a ranging request from the at least one subscriber device;
   (c) calculating a time difference between a time at which the ranging request is sent and a time at which the ranging request was received at the centralized controller device;
   (d) transmitting a signal from the MAC control layer to a physical layer, wherein the signal is a transmit/wait timing signal that represents an active or passive state of a laser; and
   (e) issuing a token from the centralized controller device to the at least one subscriber device to assign a transmission period.

17. The method of communication of claim 16, wherein the token specifies a sequence number for an encryption key.

18. The method of communication of claim 17, wherein the encryption key is used for transmission of information during the transmission period.

19. A method of communication between a centralized controller device and at least one subscriber device in an ethernet-passive optical networking system, wherein each device implements a MAC control layer having extended functionality, comprising the following steps performed via transmission of ethernet frames in the MAC control layer:
   (a) receiving a ranging grant at the at least one subscriber device from the centralized controller device;
   (b) transmitting a ranging request from the at least one subscriber device to the centralized controller device;
   (c) receiving a token at the at least one subscriber device, wherein the token is transmitted from the centralized controller device based on a calculated time difference between the centralized controller device and the subscriber device;
   (d) transmitting a signal from the MAC control layer to a physical layer, wherein the signal is a transmit/wait timing signal that represents an active or passive state of a laser.

20. The method of claim 19 wherein said subscriber device transmits in said active state only.

21. The method of claim 19 wherein said request includes a sequence number of an encryption key.

22. The method of claim 21 wherein the encryption key is used for downstream transmission from an optical line terminator to an optical network unit until another key is specified.

23. A computer program product comprising computer usable media having computer readable program code means embodied in said media for causing application programs to execute on a computer that synchronizes time between a centralized controller device and at least one subscriber device in an ethernet-passive optical networking system, said computer readable program code means comprising:
   a first computer readable program code means for causing the computer to transmit a ranging grant from the centralized controller device to the at least one subscriber device;
   a second computer readable program code means for causing the computer to receive a ranging request at the centralized controller device from the at least one subscriber device;
   a third computer readable program code means for causing the computer to transmit a signal from said MAC control layer to a physical layer wherein said signal is a transmit/wait timing signal and represents an active or passive state of a laser; and
   a fourth computer readable program code means for causing the computer to calculate a time difference between a time at which the ranging request was transmitted and a time at which the ranging request was received at the centralized controller device.

24. The computer program product of claim 23 further comprising:
a fifth computer readable program code means for causing the computer to issue a token to the at least one subscriber device from the centralized controller device.

25. A computer program product comprising computer usable media having computer readable program code means embodied in said media for causing application programs to execute on a computer that synchronizes time between a centralized controller device and at least one subscriber device in an ethernet-passive optical networking system, said computer readable program code means comprising:
a first computer readable program code means for causing the computer to receive a ranging grant at the at least one subscriber device from the centralized controller device;
a second computer readable program code means for causing the computer to transmit a ranging request from the at least one subscriber device to the centralized controller device; and
a third computer readable program code means for causing the computer to transmit a signal from a MAC control layer to a physical layer wherein said signal is a transmit/wait timing signal and represents an active or passive state of a laser.

26. The computer program product of claim 25, further comprising a fourth computer readable program code means for causing the computer to receive a token at the at least one subscriber device from the centralized controller device.

27. The computer program product of claim 25 wherein said subscriber device transmits in an active state only.

28. An ethernet-passive optical networking system, comprising:
a centralized controller device implementing a control layer;
at least one subscriber device implementing said control layer in optical communication with said centralized controller device;
wherein each said implementation of said control layer comprises:
a transmit/wait timing signal from the control layer to a physical layer, wherein said signal represents an active or passive state of a laser; and
an extension of an ethernet protocol to control transmission between subscriber devices in a Passive Optical Network (PON)-like media based on a definition of ethernet frames for control.

29. The ethernet-passive optical networking system of claim 28, wherein timing definition is based on ethernet frame handshaking.

30. The ethernet-passive optical networking system of claim 28, wherein said extension of said ethernet protocol in said centralized controller device includes token allocation.

31. The ethernet-passive optical networking system of claim 30, further comprising a configuration mechanism wherein said centralized controller device is configured to assign bandwidth to said at least one subscriber device.

32. The ethernet-passive optical networking system of claim 28, wherein said extension in said at least one subscriber device includes token request and receipt.

33. The ethernet-passive optical networking system of claim 28, wherein said subscriber device transmits in said active state only.

* * * * *